United States Patent [19]

Tracy et al.

[11] Patent Number: 4,777,409
[45] Date of Patent: Oct. 11, 1988

[54] FLUORESCENT LAMP ENERGIZING CIRCUIT

[76] Inventors: Stanley J. Tracy, P.O. Box 622, Franklin, Mich. 48025; Holtzman, Jonathan, 3175 Walma Dr., Orchard Lake, Mich. 48033

[21] Appl. No.: 60,735

[22] Filed: Jun. 10, 1987

Related U.S. Application Data

[63] Continuation-in-part of Ser. No. 592,853, Mar. 23, 1984, abandoned.

[51] Int. Cl.4 .................................................. H05B 41/36
[52] U.S. Cl. .................................. 315/200 R; 315/307; 315/291; 315/224; 315/DIG. 5
[58] Field of Search ................... 315/307, 200 R, 308, 315/291, 79, 224, 287, DIG. 5; 363/37, 19

[56] References Cited

U.S. PATENT DOCUMENTS

| | | | |
|---|---|---|---|
| 3,771,007 | 11/1973 | Johnson | 315/97 |
| 3,999,100 | 12/1976 | Dendy et al. | 315/308 |
| 4,156,166 | 5/1979 | Shapiro et al. | 315/209 R |
| 4,259,614 | 3/1981 | Kohler | 315/219 |
| 4,277,728 | 7/1981 | Stevens | 315/291 |
| 4,388,565 | 6/1983 | Rividi | 315/291 |
| 4,471,269 | 9/1984 | Ganser et al. | 315/307 |
| 4,503,364 | 3/1985 | Engel | 315/308 |
| 4,511,195 | 4/1985 | Barter | 315/308 |

FOREIGN PATENT DOCUMENTS 0070664  1/1983  European Pat. Off. .

Primary Examiner—David K. Moore
Assistant Examiner—Michael Razavi
Attorney, Agent, or Firm—Reising, Ethington, Barnard, Perry & Milton

[57] ABSTRACT

An electronic ballast or energizing circuit for a fluorescent lamp is disclosed. A rectified supply voltage is applied through an electronic switch to a fluorescent lamp through a current sensing resistor. A switching regulator produces a pulse width modulated pulse train which is applied to the electronic switch for supplying a pulsed voltage across a smoothing filter to the fluorescent lamp. The pulse width output of the switching regulator is modulated in accordance with the voltage across the sensing resistor for maintaining the current drawn by the lamp at a substantially constant value.

3 Claims, 1 Drawing Sheet

U.S. Patent
Oct. 11, 1988
4,777,409
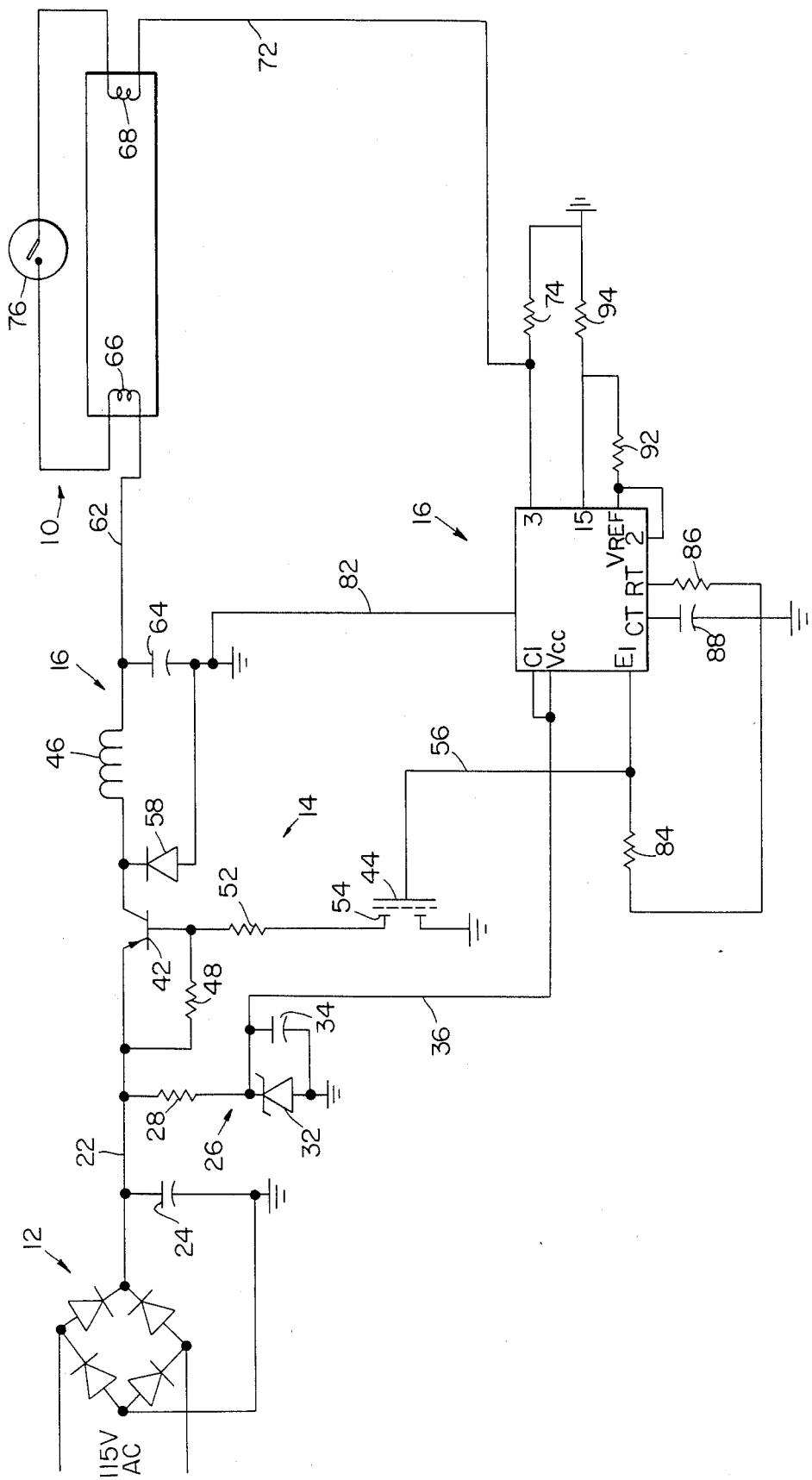

FLUORESCENT LAMP ENERGIZING CIRCUIT

This application is a continuation in part of 06/592,853 filed 3-23-84 now abandoned.

FIELD OF THE INVENTION

This invention relates to gas discharge lamps such as fluorescent lamps; more particularly, it relates to an electronic energizing circuit for such lamps.

BACKGROUND OF THE INVENTION

In certain lighting applications, the incandescent lamp has been used even though it is much less cost effective than the fluorescent lamp or other gas discharge lamps. A prime example is the exit sign which is commonly used in factories, office buildings, restaurants, apartment buildings, hotels and other such public buildings. Typically, an exit sign has used two incandescent light bulbs of 20 watts each whereas the same sign can be lighted with two fluorescent lamps of 4 watts each. Thus, the fluorescent lamp is much more energy efficient and has an operating lifetime which is greater by a factor of 3 or 4. Accordingly, the operating cost and the maintenance cost, including replacement labor, is much less for a fluorescent lamp in an exit sign than for an incandescent lamp.

The advantages of fluorescent lamps in an exit sign and the like have heretofore been recognized; however, there are difficulties in implementing such a sign which have not heretofore been adequately surmounted. One of the difficulties is that of providing a unit of suitable size and weight which can be easily installed within the limited space of an exit sign fixture to replace the incandescent bulbs. In co-pending application Ser. No. 335,252, filed Dec. 28, 1981 and assigned to the assignee of this invention, a retrofitting unit is described with a base which screws into the existing incandescent lamp socket. A ratchet assembly is provided to allow the unit to be adjusted for retrofitting in most existing exit signs. Thus, either a new or existing exit sign may be provided with fluorescent lamps.

Another difficulty to be surmounted in the use of fluorescent lamps in exit signs is that of controlling the energization of the fluorescent lamps. The conventional fluorescent lamp, namely a low pressure mercury vapor fluorescent electric discharge lamp presents certain problems in the control of energization. Since it is a gas discharge device, a high starting voltage is required to initiate ionization and current limiting must be provided to avoid damage or destruction after ionization has taken place. Such gaseous discharge devices have a negative resistance characteristic and, as the current rises, the resistance decreases thereby allowing more current to be drawn which, without control will eventually destroy the device. Control means must be provided to limit the current to a nondestructive value and yet be sufficiently high to provide the desired intensity of illumination. Generally, a fluorescent lamp is provided with a pair of heated electrodes to promote rapid starting, a transformer to provide high starting voltage, and a ballast to provide for current limiting. Various arrangements of inductors, transformers, capacitors and resistors have been used to provide the ballast for limiting the current flow. The difficulty with a transformer ballast is that it is unduly heavy and bulky for use in an exit sign. The use of a resistive ballast is undesirable because it dissipates a large amount of power and generates undesirable heat.

Electronic ballast circuits have been proposed for use with fluorescent and other gas discharge lamps. The Dendy et al U.S. Pat. No. 3,999,100 discloses a power supply with a switching regulator and a commutator for energizing a metal halide lamp such as that used in television and photographic applications. This circuit avoids the use of an inductive ballast. It uses a switching regulator operated by a frequency of 20 khz and the duty cycle is controlled by a feedback circuit responsive to both DC current and voltage supplied to the commutator. The DC voltage supplied to the commutator is regulated to provide constant power to the lamp. A voltage and current sensing circuit controls the duty cycle of the switching regulator to maintain a constant output power to the lamp.

The Johnson U.S. Pat. No. 3,771,007 discloses a power supply for a special fluorescent lamp which is adapted to provide shaped current waveform in the lamp. The lamp is energized from an AC source through a series choke and an electronic switch such as a triac. The triac is switched by a phase-delayed trigger pulse from a pulse width generating circuit connected with the line volage through a full-wave rectifier.

Other forms of electronic ballast circuits for fluorescent lamps are shown in the Knoll U.S. Pat. No. 4,127,795 and the Kohler U.S. Pat. No. 4,259,614.

A general object of this invention is to provide an electronic energizing circuit for a gas discharge lamp which overcomes certain disadvantages of the prior art and provides an energizing circuit especially adapted for use with fluorescent lamps in exit signs and the like.

SUMMARY OF THE INVENTION

In accordance with this invention, a gas discharge lamp such as a fluorescent lamp is energized from an AC voltage source by an electronic circuit which provides a variable DC voltage, constant current energization of the lamp.

Further, the energizing circuit of this invention provides direct DC coupling from the DC power source to the fluorescent lamp and the full output voltage of the power source is applied across the lamp for starting. After starting, the lamp is operated in a current limiting mode at a constant value of lamp current. This is accomplished by an energizing circuit in which the lamp is directly DC coupled across a rectifier through a switching transistor and current sensing resistor so that the full output voltage of the rectifier is applied to the lamp for starting purposes. The circuit is especially adapted for miniature fluorescent lamps such as the standardized miniature lamp of four inch length.

Further, in accordance with this invention, an energizing circuit for a fluorescent lamp is provided which comprises a rectifier across an alternating current voltage source with an electronic switching means and current sensing means in series with the lamp. A switching regulator for producing a pulse width modulated pulse train at its output has a reference input for establishing a predetermined pulse width and has a signal input for varying the pulse width in accordance with the difference between the voltage at the signal input and the voltage at the reference input. The signal input of the switching regulator is coupled with the current sensing means and the output of the regulator is coupled with said switching means whereby the current supplied to the lamp is substantially constant. Further, a smoothing filter is connected between the switching means and the lamp. Preferably the electronic switching means comprises a switching transistor and a field effect transistor with the output of the switching transistor coupled between the rectifier and the lamp and the field effect transistor having its output coupled with the input of the transistor and having its input coupled with the output of the switching regulator. Further, a second smoothing filter is connected between the rectifier and the electronic switching means. A voltage regulator is coupled with the output of the rectifier and supplies a regulated voltage to the switching regulator.

A more complete understanding of this invention may be obtained from the detailed description that follows taken with the accompanying drawings.

DESCRIPTION OF THE DRAWINGS

The single FIGURE of the drawings is a schematic diagram of the subject invention.

BEST MODE FOR CARRYING OUT THE INVENTION

Referring now to the drawings, there is shown an illustrative embodiment of the invention in an electronic energizing circuit for fluorescent lamps, especially adapted for use in exit signs and the like. It will be appreciated as the description proceeds that the invention is useful in other applications and in other embodiments.

The lamp energizing system of this invention is shown the schematic diagram of the single figure of the drawings. In general, the lamp 10 is energized from the AC power lines by an energizing circuit comprising a rectifier 12, an electronic switching means 14 and a smoothing filter 16. The electronic switching means 14 is controlled by a switching regulator 16 which regulates the lamp current at a constant value. The circuit will now be described in greater detail.

The rectifier 12 is a full-wave bridge rectifier and its input terminals are adapted to be connected across the AC supply voltage lines of 115 volts, 60 hz. One output terminal of the rectifier 12 is connected to ground and the other output terminal is connected to a conductor 22. A smoothing filter capacitor 24 is connected between the conductor 22 and ground for the purpose of reducing the ripple from the rectifier output voltage. A voltage regulator 26 is adapted to supply a regulated voltage to the switching regulator 16. It comprises a resistor 28 and a zener diode 32 connected between the conductor 22 and ground. A capacitor 34 is connected in parallel with the zener diode 32 and the regulator output is connected to a conductor 36.

The electronic switching means 14 comprises a switching transistor 42 and a field effect transistor 44 which is preferably an enhancement mode, metal oxide semiconductor, field effect transistor (MOSFET). The switching transistor 42 is of the NPN type and has its output circuit adapted to connect the output of the rectifier 12 through the smoothing filter 16 across the fluorescent lamp 10. For this purpose, the emitter of transistor 42 is connected with the conductor 22 and the collector is connected to one terminal of an inductor 46 of the filter 16. The base of transistor 42 is connected through a resistor 48 to the conductor 22 and through a resistor 52 to the source electrode 54 of the MOSFET 44. The drain electrode of the MOSFET 44 is connected to ground and the gate electrode thereof is connected through a conductor 56 to the switching regulator, as will be described subsequently. A protective diode 58 is connected between the collector of transistor 42 and ground.

The smoothing filter 16 comprises the inductor 46 connected serially between the transistor 42 and a conductor 62. The filter 16 further comprises a shunt capacitor 64 connected between the conductor 62 and ground.

The fluorescent lamp 10 is of conventional structure. The lamp 10 is especially adapted for use in exit signs and, as such, it is the standardized fluorescent lamp of four inch length known as a miniature fluorescent lamp. The lamp includes a pair of starting electrodes 66 and 68. One terminal of the electrode 66 is connected with the conductor 62 and one terminal of the electrode 68 is connected through a conductor 72 and a current sensing resistor 74 to ground. The other terminals of the electrodes 66 and 68 are connected together through a conventional bimetallic starter switch 76. As will be described below, the lamp is started by application of full power from the rectifier 12 and, immediately upon starting it is operated in a current limiting mode to protect the lamp.

The switching regulator 16 is a conventional integrated circuit chip of the type MC34060 available from the Motorola Corporation of Phoenix, Arizona. The supply voltage terminals VCC and C1 are connected with the supply voltage regulator 26 through the conductor 36. Pin 1 of the switching regulator is connected to ground through a conductor 82. The output pin E1 of the switching regulator 16 is adapted to produce a square wave pulse train across a load resistor 84. A resistor 86 and capacitor 88 are connected, respectively, between pins RT and CT and ground to establish the basic operating frequency of the switching regulator. A voltage reference pin VREF and pin 2 are connected through a resistor 92 and a resistor 94 to ground. Pin 15 is connected through the resistor 94 to ground and this arrangement establishes a reference voltage for the switching regulator 16 to establish a reference value of pulse width of the output pulse train. An input pin 3 is connected through the current sensing resistor 74 to ground and thus receives an input voltage corresponding to the value of current drawn by the fluorescent lamp 10.

The operation of the lamp energizing circuit of this invention is as follows. When the lamp 10 is first turned on by connecting the rectifier 12 with the AC voltage source, the bimetal starting switch 76 is closed and the lamp is cold. The output voltage of the rectifier 12 is filtered by the capacitor 24 to reduce the ripple content and the filtered voltage is applied across the voltage regulator 26. This regulator supplies the operating voltage to the switching regulator 16. Thus, the regulator 16 is turned on. The MOSFET 44 is normally off and the switching transistor 42 is normally off. The bimetallic starter switch 76 allows a starting current to heat the electrodes 66 and 68. During this condition, the current drawn through the current sensing resistor 74 is relatively small and the switching regulator 16 operates to switch the MOSFET 44 and the switching transistor 42 at the maximum duty cycle. The switching regulator 16 produces a square wave output pulse train on the conductor 56 which turns on the MOSFET 44 for the duration of each pulse in the pulse train. When the MOSFET 44 is turned on, the switching transistor 42 is turned on and the rectifier output voltage is applied through the switching transistor 42 across the smoothing filter 16. The pulse train produced by the switching transistor 42 at the input of the smoothing filter 16 may have, for example, a pulse amplitude of about 160 volts. Since the lamp 10 is directly DC-coupled across the rectifier 12 through the switching transistor 42, filter 16 and current sensing resistor 74, the full output voltage of the rectifier is applied across the gas column in the fluorescent lamp. When the heaters 66 and 68 are sufficiently heated the gas is ionized and the lamp is started. In this condition the lamp presents a very low resistance in the circuit and the current drawn through the circuit increases. An increased voltage across the sensing resistor 74 is applied to the input pin 3 and compared by the switching regulator with the reference voltage on the pin VREF. The reference voltage is initially established to correspond to the desired value of regulated lamp current. Accordingly, if the input volage at pin 3 exceeds the reference voltage, the switching regulator 16 is effective to reduce the pulse width of the output pulse train on conductor 56. This has the effect of reducing the duty cycle or on time of the switching transistor 42 so that the effective voltage at the output of the filter 16 is reduced and hence the current through the fluorescent lamp is reduced. If the voltage across the sensing resistor 74 should decrease below the reference voltage, the switching regulator 16 is effective to increase the pulse width of the output pulse train on conductor 56. Accordingly, the duty cycle of the switching transistor 42 is increased. This increases the effective output voltage of the filter 16 and hence the current drawn by the fluorescent lamp 10 is increased. In this manner, the fluorescent lamp 10 is operated at a substantially constant current.

Although the description of this invention has been given with reference to a particular embodiment, it is not to be construed in the limiting sense. Many variations and modifications will now occur to those skilled in the art. For a definition of the invention reference is made to the appended claims.

What is claimed is:

1. An energizing circuit for operating a fluorescent lamp at a predetermined constant current comprising:
    a rectifier adapted to be connected across an AC voltage source,
    an electronic switching means having an input and an output,
    a current sensing means,
    a smoothing filter,
    said lamp being directly DC coupled across said rectifier through the series combination of the output of said switching means, said filter and said current sensing means,
    a switching regulator having an output for producing a pulse width modulated pulse train having a variable duty cycle, a reference input having a reference voltage applied thereto to establish a predetermined duty cycle corresponding to said constant current, said regulator also having a signal input for varying said duty cycle in accordance with the difference between the voltage applied thereto and said reference voltage, said signal input being coupled with said current sensing means,
    said switching means having its input coupled with the output of said switching regulator whereby the switching means produces a DC pulse train having a duty cycle which increases when the current through said current sensing means in less than said predetermined constant current whereby the switching means is operated at a higher duty cycle for producing a high starting voltage for said lamp and whereby the duty cycle decreases when the current through said current sensing means is greater than said predetermined constant current whereby the switching means is operated at a lower duty cycle for maintaining said constant current when the lamp is started.

2. The invention as defined in claim 1 wherein said electronic switching means comprises a switching transistor and a field effect transistor, said switching transistor having its output coupled between said rectifier and said lamp, said field effect transistor having its output coupled with the input of said switching transistor and having its input coupled with the output of said switching regulator.

3. The invention as defined in claim 2 including a voltage regulator coupled with the output of said rectifier and supplying a regulated voltage to said switching regulator.

* * * * *